US012051292B2

(12) United States Patent
Zheng

(10) Patent No.: US 12,051,292 B2
(45) Date of Patent: Jul. 30, 2024

(54) INTELLIGENT LOCK MANAGEMENT SYSTEM

(71) Applicants: Li Zheng, Kowloon (HK); PIN GENIE LIMITED, Kowloon (HK)

(72) Inventor: Li Zheng, Kowloon (HK)

(73) Assignees: Li Zheng, Kowloon (HK); PIN GENIE LIMITED, Kowloon (HK)

( * ) Notice: Subject to any disclaimer, the term of this patent is extended or adjusted under 35 U.S.C. 154(b) by 123 days.

(21) Appl. No.: 17/968,459

(22) Filed: Oct. 18, 2022

(65) Prior Publication Data

US 2024/0127649 A1 Apr. 18, 2024

(51) Int. Cl.

| | |
|---|---|
| ***G07C 9/00*** | (2020.01) |
| ***G07C 9/32*** | (2020.01) |
| ***G07C 9/38*** | (2020.01) |

(52) U.S. Cl.

CPC ..... *G07C 9/00571* (2013.01); *G07C 9/00309* (2013.01); *G07C 9/32* (2020.01); *G07C 9/38* (2020.01); *G07C 2009/00769* (2013.01); *G07C 2209/04* (2013.01)

(58) Field of Classification Search

None

See application file for complete search history.

(56) References Cited

U.S. PATENT DOCUMENTS 10,378,239 B2 8/2019 Avganim ................ E05B 47/00
2023/0119043 A1 * 4/2023 Crettenand ........... H04L 12/282 709/224

FOREIGN PATENT DOCUMENTS

CN 201507172 U 6/2010

* cited by examiner

*Primary Examiner* — K. Wong
(74) *Attorney, Agent, or Firm* — Stein IP, LLC

(57) ABSTRACT

The present invention relates to the technical field of intelligent locks, and particularly to an intelligent lock management system, comprising an intelligent lock unit, wherein the intelligent lock unit comprises an intelligent lock, a lock control module and an identification terminal, and the intelligent lock unit is used for controlling the usage states of the intelligent lock; a server unit, wherein the server unit is communicatively connected with the intelligent lock unit, and the server unit is used for processing the receiving and sending of user information and control information. The server unit comprises an information writing module, a permission management module, an information deletion module and a data recording module. The permission management module is used for classifying and managing user permission data, and the user permission levels are at least 2. In the present invention, the permission management of the lock is divided into at least two levels. After the higher level permission information is input into the intelligent lock, the lower level permission will automatically lose the permission to manage the lock. Therefore, in order to facilitate the unified management of the lock permission, the safety for a terminal customer to use locks is enhanced after the high permission is delivered to the terminal customer.

11 Claims, 2 Drawing Sheets

INTELLIGENT LOCK MANAGEMENT SYSTEM

TECHNICAL FIELD

The present invention relates to a management system, and particularly to an intelligent lock management system, which belongs to the technical field of intelligent locks.

BACKGROUND

An intelligent lock is an improved lock that is different from a traditional mechanical lock and is more intelligent and simplified in user security, identification and management aspects. A known intelligent lock, for example, is seen in a patent document of U.S. Pat. No. 10,378,239. The intelligent lock can be operated electronically and controlled by mobile devices (such as telephone, PC, tablet personal computer, etc.). The locking and unlocking states of the intelligent lock can be controlled through software in mobile devices, for example, in a manner of setting passwords by an APP. Another known intelligent lock using an IC card, for example, is seen in a Chinese patent document (Application No. CN200920312696.6). The patent document discloses a flexible and lightweight intelligent lock with a magnetic card, comprising a reverse locking mechanism of a big dead bolt telescoping mechanism, a key door opening mechanism and a magnetic card door opening mechanism. When a door is opened by a mechanical key, a mechanical key dial block pushes a second mechanical key fork by toggling a first mechanical key fork, to push a combination bolt and a reverse lock plate for clamping the combination bolt, and at the same time, bring the big dead bolt telescoping mechanism to move, so that the big dead bolt is retracted into a core of a mirror, thereby completing a door opening action. When the door is opened by the magnetic card, a clutch engages with a four-corner teleflex, and the clutch and a clutch fork form a cam mechanism. The four-corner teleflex is connected with a door handle of an outer panel. When the handle is rotated, the clutch rotates, so that the clutch fork toggles the combination bolt and the second mechanical key fork. The second mechanical key fork toggles the big dead bolt telescoping mechanism, so that the big dead bolt is retracted into the core of the lock, thereby completing the door opening action. With the advantages of small volume, simple structure, good operation hand feeling, etc., the intelligent lock structure is a widely used lock structure, and the unlocking can be quickly completed through the IC card when in use. Generally, during the lock batch installation or decoration, decoration personnel will open the lock by inputting the IC card. After the lock is delivered to the customer for use, if the use permission of the card input in the previous stage is not timely prohibited, the card used in the previous stage still can be normally used, which is not disadvantageous to management of lock permission and the distinction of responsibilities.

In view of this, the present invention is proposed to help to solve the above-mentioned problem.

SUMMARY

The purpose of the invention is to provide an intelligent lock management system in order to solve the above problem. The permission management of the lock is divided into at least two levels. After the higher level permission information is input into the intelligent lock, the lower level permission will automatically lose the permission to manage the lock. Therefore, in order to facilitate the unified management of the lock permission, the safety for a terminal customer to use locks is enhanced after the high permission is delivered to the terminal customer.

The purpose of the present invention is realized by the following technical solution:

An intelligent lock management system comprises:

an intelligent lock unit, wherein the intelligent lock unit comprises an intelligent lock, a lock control module and an identification terminal, and the intelligent lock unit is used for controlling usage states of the intelligent lock;

a server unit, wherein the server unit is communicatively connected with the intelligent lock unit, the server unit is used for processing the receiving and sending of user information and control information, the server unit comprises an information writing module, a permission management module, an information deletion module and a data recording module, the permission management module is used for classifying and managing user permission data, and the user permission level comprises high level permission, medium level permission and low level permission;

a client unit, wherein the client unit is communicatively connected with the intelligent lock unit, and the client unit is used for sending the control information on the intelligent lock;

the management execution of the intelligent lock management system is completed in the following manners:

the server unit sends the user permission level data information to the client unit;

the client unit interacts with the intelligent lock unit, so that the intelligent lock unit obtains the user permission level data information on the client unit currently interacted therewith;

the intelligent lock unit transmits the acquired the user permission level data information to the server unit; and the server unit deletes the user permission level data information below the user permission corresponding to the user permission level data information, thus the intelligent lock unit can no longer control the usage states of the intelligent lock based on the deleted user permission level information.

The present invention also provides the following more technical solutions to achieve the purpose of the present invention:

An intelligent lock management system comprises:

an intelligent lock unit, wherein the intelligent lock unit comprises an intelligent lock, a lock control module and an identification terminal, and the intelligent lock unit is used for controlling usage states of the intelligent lock;

a server unit, wherein the server unit is communicatively connected with the intelligent lock unit, the server unit is used for processing the receiving and sending of user information and control information, the server unit comprises an information writing module, a permission management module, an information deletion module and a data recording module, and the permission management module is used for classifying and managing user permission data, and the user permission levels are at least 2; and a client unit, wherein the client unit is communicatively connected with the intelligent lock unit, and the client unit is used for sending the control information on the intelligent lock.

Further, the communication connection mode among the server unit, the client unit and the intelligent lock unit is wireless communication.

Further, the identification terminal comprises an IC card reader, a password recognizer, a fingerprint recognizer, a key identification module, a vein recognizing instrument, a pupil recognizer and a face recognizer.

Further, the client unit comprises an intelligent IC card, user password information, user fingerprint information, an electronic virtual card, vein information, pupil information and face information.

Further, the lock control module is used for controlling the usage modes of the intelligent lock, and the intelligent lock unit can send the same command information to the lock control module after receiving the command information sent by the server unit.

Further, the server unit can receive the instruction information sent by the client unit, and the intelligent lock unit can receive the control instruction sent by the server unit.

Further, the information writing module is used for inputting the low management permission data, the medium management permission data and the high management permission data from the user into the server unit.

Further, the information deletion module is used for deleting the permission information below higher level permission after the client unit uses the higher level permission.

Further, the data recording module is used for recording the data information that the intelligent lock unit is controlled through various levels of user permissions.

Further, the client unit can be configured to be related with a plurality of intelligent lock units and can interact with any intelligent lock unit.

The present invention has the following technical effects and advantages:

In the present invention, the permission management of the lock is divided into at least two levels. After the higher level permission information is input into the intelligent lock, the lower level permission will automatically lose the permission to manage the lock. Therefore, in order to facilitate the unified management of the lock permission, the safety for a terminal customer to use locks is enhanced after the high permission is delivered to the terminal customer.

DETAILED DESCRIPTION

Figure 1:
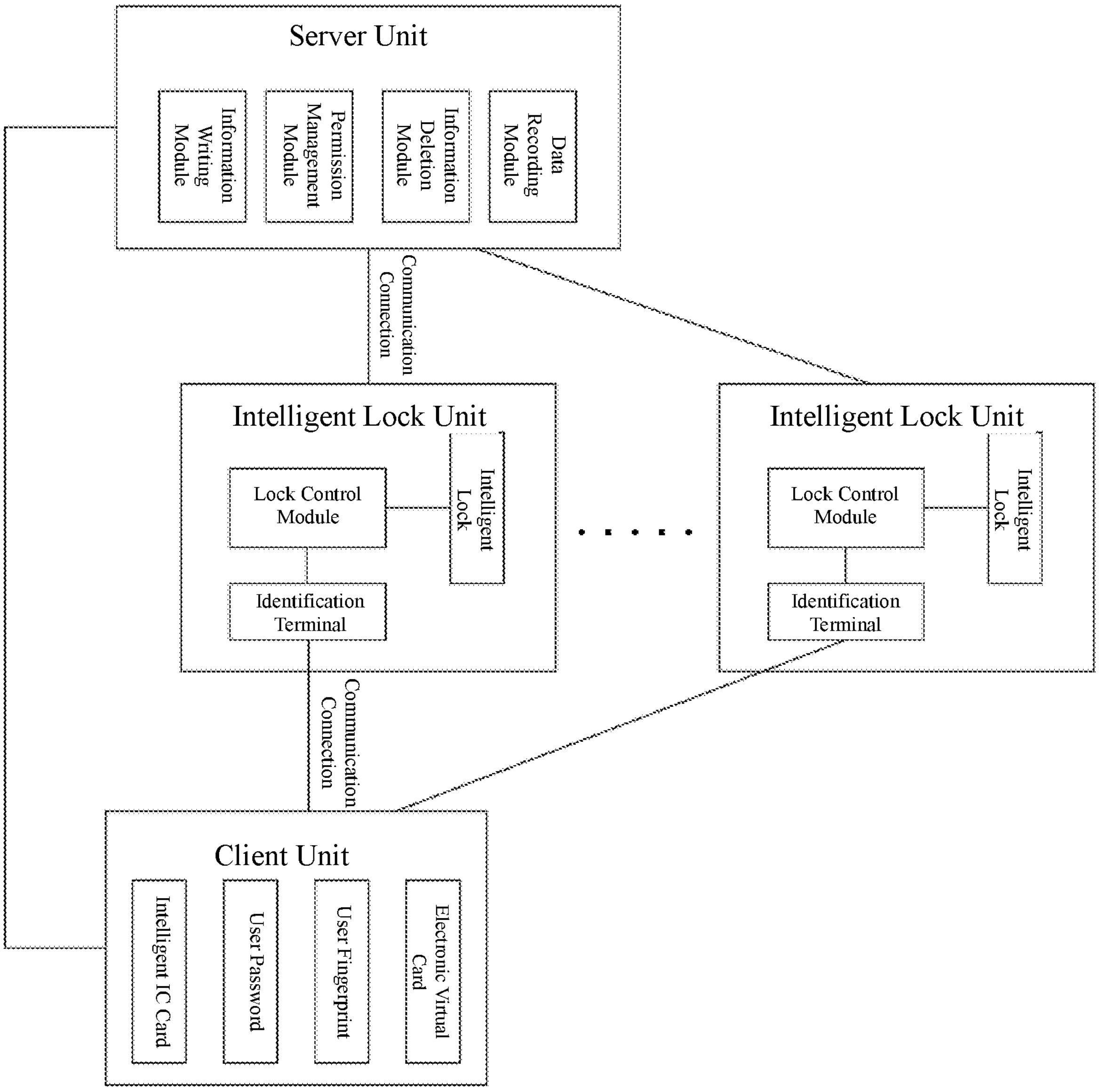
FIG. 1 is a system diagram of the present invention.
Figure 2:
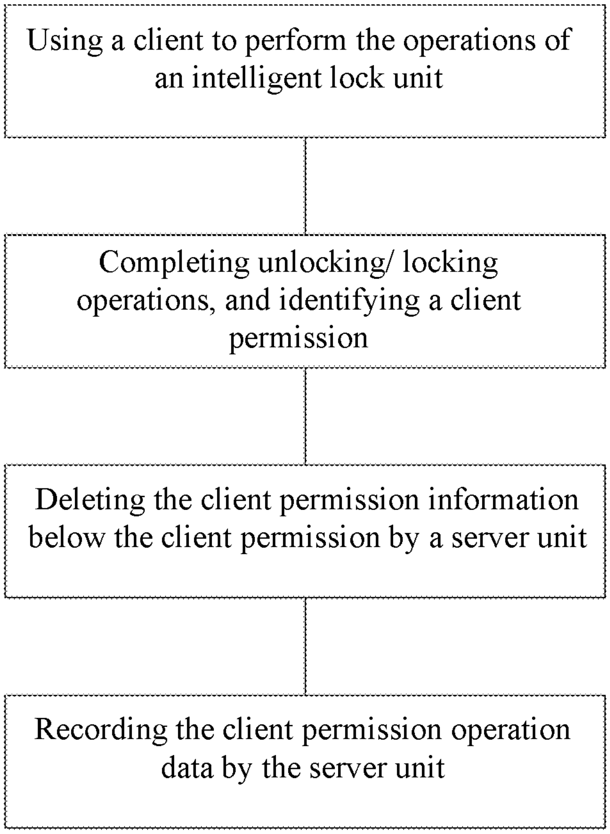
FIG. 2 is a flow chart of the present invention.

Embodiment 1: comprising:

- an intelligent lock unit, wherein the intelligent lock unit comprises an intelligent lock, a lock control module and an identification terminal, and the intelligent lock unit is used for controlling usage states of the intelligent lock;
- a server unit, wherein the server unit is communicatively connected with the intelligent lock unit, the server unit is used for processing the receiving and sending of user information and control information, the server unit comprises an information writing module, a permission management module, an information deletion module and a data recording module, and the permission management module is used for classifying and managing user permission data, and the user permission levels are at least 2; and
- a client unit, wherein the client unit is communicatively connected with the intelligent lock unit, and the client unit is used for sending the control information on the intelligent lock.

The communication connection mode among the server unit, the client unit and the intelligent lock unit is wireless communication.

The identification terminal is an IC card reader, and the client unit is an intelligent IC card. The lock control module is used for controlling the usage modes of the intelligent lock. The intelligent lock unit can send the same command information to the lock control module after receiving the command information sent by the server unit. The server unit can receive the instruction information sent by the client unit. The intelligent lock unit can receive the control instruction sent by the server unit. The information writing module is used for inputting the low management permission data, the medium management permission data and the high management permission data from the user into the server unit. The information deletion module is used for deleting the permission information below higher level permission after the client unit uses the higher level permission. The data recording module is used for recording the data information that the intelligent lock unit is controlled through various levels of user permissions. The client unit can be configured to be related with a plurality of intelligent lock units and can interact with any intelligent lock unit.

In this embodiment, the intelligent IC card is used as a client, and has three types of intelligent IC cards, comprising an intelligent IC card with low management permission, an intelligent IC card with medium management permission and an intelligent IC card with high management permission. In the actual production, the intelligent IC card with low management permission, the intelligent IC card with medium management permission and the intelligent IC card with high management permission can be produced in red, yellow and blue. Before use, the information from the red intelligent IC card with low management permission, the yellow intelligent IC card with medium management permission and the blue intelligent IC card with high management permission are input to the server unit through the information writing module. The red intelligent IC card with low management permission, the yellow intelligent IC card with medium management permission and the blue intelligent IC card with high management permission can be classified through the server unit. When the red intelligent IC card with low management permission is used, the red intelligent IC card with low management permission is attached to the IC card reader, and the IC card reader identifies the red intelligent IC card with low management permission. After identifying the information from the red intelligent IC card with low management permission, the server unit can transfer the instruction information to the intelligent lock unit, and at the same time, the data recording module can record the frequency of use of the red intelligent IC card with low management permission. The intelligent lock unit can complete the instructions sent by the red intelligent IC card with low management permission through the lock control module. When the yellow intelligent IC card with medium management permission is used, the yellow intelligent IC card with medium management permission is attached to the IC card reader, and the IC card reader identifies the yellow intelligent IC card with medium management permission. After identifying the information from the yellow intelligent IC card with medium management permission, the server unit can transfer the instruction information to the intelligent lock unit, and at the same time, the data recording module can record the frequency of use of the yellow intelligent IC card with medium management permission. The intelligent lock unit can complete the instructions sent by the yellow intelligent IC card with medium management permission through the lock control module, and the information deletion module can delete the information from the red intelligent IC card with low management permission. Therefore, the red intelligent IC card with low management permission cannot be unceasingly used. When the blue intelligent IC card with high management permission is used, the blue intelligent IC card with high management permission is attached to the IC card reader, and the IC card reader identifies the blue intelligent IC card with high management permission. After identifying the information from the blue intelligent IC card with high management permission, the server unit can transfer the instruction information to the intelligent lock unit, and at the same time, the data recording module can record the frequency of use of the blue intelligent IC card with high management permission. The intelligent lock unit can complete the instructions sent by the blue intelligent IC card with high management permission through the lock control module, and the information deletion module can delete the information from the red intelligent IC card with low management permission and the yellow intelligent IC card with medium management permission. Therefore, the red intelligent IC card with low management permission and the yellow intelligent IC card with medium management permission cannot be unceasingly used.

Embodiment 2: comprising:

- an intelligent lock unit, wherein the intelligent lock unit comprises an intelligent lock, a lock control module and an identification terminal, and the intelligent lock unit is used for controlling usage states of the intelligent lock;
- a server unit, wherein the server unit is communicatively connected with the intelligent lock unit, the server unit is used for processing the receiving and sending of user information and control information, the server unit comprises an information writing module, a permission management module, an information deletion module and a data recording module, and the permission management module is used for classifying and managing low management permission data, medium management permission data and high management permission data; and
- a client unit, wherein the client unit is communicatively connected with the intelligent lock unit, and the client unit is used for sending the control information on the intelligent lock.

The communication connection mode among the server unit, the client unit and the intelligent lock unit is wireless communication.

The identification terminal is a password recognizer, and the client unit is user password information. The lock control module is used for controlling the usage modes of the intelligent lock. The intelligent lock unit can send the same command information to the lock control module after receiving the command information sent by the server unit. The server unit can receive the instruction information sent by the client unit. The intelligent lock unit can receive the control instruction sent by the server unit. The information writing module is used for inputting the low management permission data, the medium management permission data and the high management permission data from the user into the server unit. The information deletion module is used for deleting the permission information below higher level permission after the client unit uses the higher level permission. The data recording module is used for recording the data information that the intelligent lock unit is controlled through various levels of user permissions.

In this embodiment, the user passwords are used as clients and have three types of passwords, comprising low permission user password, medium permission user password and high permission user password. The information on the low permission user password, the medium permission user password and the high permission user password is input into the server unit by an information writing module before use. The permissions of the low permission user password, the medium permission user password and the high permission user password can be classified through the server unit. When the low permission user passwords are used, the low permission user passwords are input into the password recognizer, and the password recognizer recognizes the low permission user passwords. The server unit can transfer the instruction information to the intelligent lock unit after identifying the low permission user password information, and at the same time, the data recording module can record the frequency of use for the low permission user password. The intelligent lock unit can complete the instruction sent by the low permission user password through the lock control module. When the medium permission user passwords are used, the medium permission user passwords are input into the password recognizer, and the password recognizer recognizes the medium permission user passwords. The server unit can transfer the instruction information to the intelligent lock unit after identifying the medium permission user password information, and at the same time, the data recording module can record the frequency of use for the medium permission user password. The intelligent lock unit can complete the instruction sent by the medium permission user password through the lock control module, and the information deletion module can delete the information on the low permission user password. Therefore, the low permission user password cannot be unceasingly used. When the high permission user passwords are used, the high permission user passwords are input into the password recognizer, and the password recognizer recognizes the high permission user passwords. The server unit can transfer the instruction information to the intelligent lock unit after identifying the high permission user password information, and at the same time, the data recording module can record the frequency of use for the high permission user password. The intelligent lock unit can complete the instruction sent by the high permission user password through the lock control module, and the information deletion module can delete the information on the low permission user password and the medium permission user password. Therefore, the low permission user password and the medium permission user password cannot be unceasingly used.

Embodiment 3: comprising:

- an intelligent lock unit, wherein the intelligent lock unit comprises an intelligent lock, a lock control module and an identification terminal, and the intelligent lock unit is used for controlling usage states of the intelligent lock;
- a server unit, wherein the server unit is communicatively connected with the intelligent lock unit, the server unit is used for processing the receiving and sending of user information and control information, the server unit comprises an information writing module, a permission management module, an information deletion module and a data recording module, and the permission management module is used for classifying and managing low management permission data, medium management permission data and high management permission data; and a client unit, wherein the client unit is communicatively connected with the intelligent lock unit. The client unit is used for sending the control information on the intelligent lock.

The communication connection mode among the server unit, the client unit and the intelligent lock unit is wireless communication.

The identification terminal is a fingerprint recognizer, and the client unit is user fingerprint information. The lock control module is used for controlling the usage modes of the intelligent lock. The intelligent lock unit can send the same command information to the lock control module after receiving the command information sent by the server unit. The server unit can receive the instruction information sent by the client unit. The intelligent lock unit can receive the control instruction sent by the server unit. The information writing module is used for inputting the low management permission data, the medium management permission data and the high management permission data from the user into the server unit. The information deletion module is used for deleting the permission information below higher level permission after the client unit uses the higher level permission. The data recording module is used for recording the data information that the intelligent lock unit is controlled through various levels of user permissions.

In this embodiment, user fingerprint information is used as a client and has three types of information, comprising low permission user fingerprint information, medium permission user fingerprint information and high permission user fingerprint information. The low permission user fingerprint information, the medium permission user fingerprint information and the high permission user fingerprint information is input into a server unit by an information writing module before use. The permissions of the low permission user fingerprint information, the medium permission user fingerprint information and the high permission user fingerprint information can be classified through the server unit. When the low permission user fingerprint information is used, the low permission user fingerprint is attached to the fingerprint recognizer, and the fingerprint recognizer recognizes the low permission user fingerprint information. The server unit can transfer the instruction information to the intelligent lock unit after identifying the low permission user fingerprint information, and at the same time, the data recording module can record the frequency of use for the low permission user fingerprint information. The intelligent lock unit can complete the instruction sent by the low permission user fingerprint information through the lock control module. When the medium permission user fingerprint information is used, the medium permission user fingerprint information is attached to the fingerprint recognizer, and the fingerprint recognizer recognizes the medium permission user fingerprint information. The server unit can transfer the instruction information to the intelligent lock unit after identifying the medium permission user fingerprint information, and at the same time, the data recording module can record the frequency of use for the medium permission user fingerprint information. The intelligent lock unit can complete the instruction sent by the medium permission user fingerprint information through the lock control module, and the information deletion module can delete the low permission user fingerprint information. Therefore, the low permission user fingerprint information cannot be unceasingly used. When the high permission user fingerprint information is used, the high permission user fingerprint is attached to the fingerprint recognizer, and the fingerprint recognizer recognizes the high permission user fingerprint information. The server unit can transfer the instruction information to the intelligent lock unit after identifying the high permission user fingerprint information, and at the same time, the data recording module can record the frequency of use for the high permission user fingerprint information. The intelligent lock unit can complete the instruction sent by the high permission user fingerprint information through the lock control module, and the information deletion module can delete the low permission user fingerprint information and the medium permission user fingerprint information. Therefore, the low permission user fingerprint information and the medium permission user fingerprint information cannot be unceasingly used.

Embodiment 4: comprising:

an intelligent lock unit, wherein the intelligent lock unit comprises an intelligent lock, a lock control module and an identification terminal, and the intelligent lock unit is used for controlling usage states of the intelligent lock;

a server unit, wherein the server unit is communicatively connected with the intelligent lock unit, the server unit is used for processing the receiving and sending of user information and control information, the server unit comprises an information writing module, a permission management module, an information deletion module and a data recording module, and the permission management module is used for classifying and managing low management permission data, medium management permission data, and high management permission data; and a client unit, wherein the client unit is communicatively connected with the intelligent lock unit, and the client unit is used for sending the control information on the intelligent lock.

The communication connection mode among the server unit, the client unit and the intelligent lock unit is wireless communication.

The identification terminal is a key identification module, and the client unit is an electronic virtual card. The lock control module is used for controlling the usage modes of the intelligent lock. The intelligent lock unit can send the same command information to the lock control module after receiving the command information sent by the server unit. The server unit can receive the instruction information sent by the client unit. The intelligent lock unit can receive the control instruction sent by the server unit. The information writing module is used for inputting the low management permission data, the medium management permission data and the high management permission data from the user into the server unit. The information deletion module is used for deleting the permission information below higher level permission after the client unit uses the higher level permission. The data recording module is used for recording the data information that the intelligent lock unit is controlled through various levels of user permissions.

In this embodiment, a virtual electronic card produced by an intelligent terminal is used as a client and has three types of cards, comprising a low permission virtual electronic card, a medium permission virtual electronic card and a high permission virtual electronic card. The information on the low permission virtual electronic card, the medium permission virtual electronic card and the high virtual electronic card is input into the server unit by the information writing module before use. The permissions of the low permission virtual electronic card, the medium permission virtual electronic card and the high permission virtual electronic card can be classified through the server unit. When the low permission virtual electronic card is used, the low permission virtual electronic card is input into a key identification module, and the fingerprint recognizer recognizes the low permission virtual electronic card. The server unit can transfer the instruction information to the intelligent lock unit after identifying the low permission virtual electronic card information, and at the same time, the data recording module can record the frequency of use for the low permission virtual electronic card. The intelligent lock unit can complete the instruction sent by the low permission virtual electronic card through the lock control module. When the medium permission virtual electronic card is used, the medium permission virtual electronic card is input into the key identification module, and the fingerprint recognizer recognizes the medium permission virtual electronic card. The server unit can transfer the instruction information to the intelligent lock unit after identifying the medium permission virtual electronic card information, and at the same time, the data recording module can record the frequency of use for the medium permission virtual electronic card. The intelligent lock unit can complete the instruction sent by the medium permission virtual electronic card through the lock control module, and the information deletion module can delete the information on the low permission virtual electronic card. Therefore, the low permission virtual electronic card cannot be unceasingly used. When the high permission virtual electronic card is used, the high permission virtual electronic card is input into the key identification module, and the fingerprint recognizer recognizes the high permission virtual electronic card. The server unit can transfer the instruction information to the intelligent lock unit after identifying the high permission virtual electronic card, and at the same time, the data recording module can record the frequency of use for the high permission virtual electronic card. The intelligent lock unit can complete the instruction sent by the high permission virtual electronic card through the lock control module, and the information deletion module can delete the information on the low permission virtual electronic card and the medium permission virtual electronic card. Therefore, the low permission virtual electronic card and the medium permission virtual electronic card cannot be unceasingly used.

Embodiment 5: comprising:

Unlike the above-mentioned embodiment, further, in this embodiment, the client unit can be configured to be related with a plurality of intelligent lock units and can interact with any intelligent lock unit in the manners described in the above-mentioned embodiments 1-4. Specifically, as an exemplary description, for a building with a plurality of rooms, the intelligent lock unit of any one of the rooms which need to be authorized before entering can be controlled for performing locking and unlocking operations, after an identification operation is completed by a client unit and an identification module, such that all lower level permissions below a higher level permission of the client unit, which correspond to the intelligent lock unit, will be canceled, when the client unit having the higher level permission interacts with the corresponding intelligent lock unit. Thus, the client unit having the lower level permission cannot interact with the intelligent lock unit, and especially, the locking and unlocking operations of the intelligent lock unit cannot be controlled by the client unit.

For those skilled in the art, apparently, the present invention is not limited to details of the above demonstrative embodiments. Moreover, the present invention can be realized in other specific forms without departing from the spirit or basic feature of the present invention. Therefore, in all respects, the embodiments shall be regarded to be demonstrative and nonrestrictive. The scope of the present invention is defined by appended claims, rather than the above description. Therefore, the present invention is intended to include all changes falling into the meaning and the scope of equivalent elements of claims within the present invention. Any drawing mark in claims shall not be regarded to limit the concerned claims.

In addition, it shall be understood that although the description is explained in accordance with the embodiments, not every embodiment only includes one independent technical solution. This narration mode of the description is only for clarity. Those skilled in the art shall regard the description as a whole, and the technical solution in each embodiment can also be appropriately combined to form other embodiments understandable for those skilled in the art.

The invention claimed is:

1. An intelligent lock management system, comprising:

an intelligent lock unit, wherein the intelligent lock unit comprises an intelligent lock, a lock control module and an identification terminal, and the intelligent lock unit is used for controlling usage states of the intelligent lock;

a server unit, wherein the server unit is communicatively connected with the intelligent lock unit, the server unit is used for processing the receiving and sending of user information and control information, the server unit comprises an information writing module, a permission management module, an information deletion module and a data recording module, the permission management module is used for classifying and managing user permission data, and the user permission level comprises high level permission, medium level permission and low level permission;

a client unit, wherein the client unit is communicatively connected with the intelligent lock unit, and the client unit is used for sending the control information on the intelligent lock;

the management execution of the intelligent lock management system is completed in the following manners:

the server unit sends the user permission level data information to the client unit;

the client unit interacts with the intelligent lock unit, so that the intelligent lock unit obtains the user permission level data information on the client unit currently interacted therewith;

the intelligent lock unit transmits the acquired the user permission level data information to the server unit; and the server unit deletes the user permission level data information below the user permission corresponding to the user permission level data information, thus the intelligent lock unit can no longer control the usage states of the intelligent lock based on the deleted user permission level information.

2. An intelligent lock management system, comprising:

an intelligent lock unit, wherein the intelligent lock unit comprises an intelligent lock, a lock control module and an identification terminal, and the intelligent lock unit is used for controlling usage states of the intelligent lock;

a server unit, wherein the server unit is communicatively connected with the intelligent lock unit, the server unit is used for processing the receiving and sending of user information and control information, the server unit comprises an information writing module, a permission management module, an information deletion module and a data recording module, and the permission management module is used for classifying and managing user permission data, and the user permission levels are at least 2; and a client unit, wherein the client unit is communicatively connected with the intelligent lock unit, and the client unit is used for sending the control information on the intelligent lock.

3. The intelligent lock management system according to claim 2, wherein the communication connection mode among the server unit, the client unit and the intelligent lock unit is wireless communication.

4. The intelligent lock management system according to claim 2, wherein the identification terminal comprises an IC card reader, a password recognizer, a fingerprint recognizer, a key identification module, a vein recognizing instrument, a pupil recognizer and a face recognizer.

5. The intelligent lock management system according to claim 2, wherein the client unit comprises an intelligent IC card, user password information, user fingerprint information, an electronic virtual card, vein information, pupil information and face information.

6. The intelligent lock management system according to claim 2, wherein the lock control module is used for controlling the usage modes of the intelligent lock, and the intelligent lock unit can send the same command information to the lock control module after receiving the command information sent by the server unit.

7. The intelligent lock management system according to claim 2, wherein the server unit can receive the instruction information sent by the client unit, and the intelligent lock unit can receive the control instruction sent by the server unit.

8. The intelligent lock management system according to claim 2, wherein the information writing module is used for inputting the low management permission data, the medium management permission data and the high management permission data from the user into the server unit.

9. The intelligent lock management system according to claim 2, wherein the information deletion module is used for deleting the permission information below higher level permission after the client unit uses the higher level permission.

10. The intelligent lock management system according to claim 2, wherein the data recording module is used for recording the data information that the intelligent lock unit is controlled through various levels of user permissions.

11. The intelligent lock management system according to claim 2, wherein the client unit can be configured to be related with a plurality of intelligent lock units and can interact with any intelligent lock unit.

* * * * *